US011288792B2

(12) United States Patent
Shreve et al.

(10) Patent No.: US 11,288,792 B2
(45) Date of Patent: Mar. 29, 2022

(54) METHOD AND SYSTEM FOR CHANGE DETECTION USING AR OVERLAYS

(71) Applicant: Palo Alto Research Center Incorporated, Palo Alto, CA (US)

(72) Inventors: Matthew A. Shreve, Mountain View, CA (US); Lisa S. E. Rythen Larsson, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 128 days.

(21) Appl. No.: 16/795,379

(22) Filed: Feb. 19, 2020

(65) Prior Publication Data
US 2021/0256674 A1 Aug. 19, 2021

(51) Int. Cl.
| | |
|---|---|
| *G06T 7/90* | (2017.01) |
| *G06T 7/00* | (2017.01) |
| *B33Y 50/00* | (2015.01) |
| *G06T 7/136* | (2017.01) |
| *G06T 7/13* | (2017.01) |
| *B29C 64/386* | (2017.01) |
| *G06T 17/20* | (2006.01) |

(52) U.S. Cl.
CPC ............ *G06T 7/001* (2013.01); *B29C 64/386* (2017.08); *B33Y 50/00* (2014.12); *G06T 7/13* (2017.01); *G06T 7/136* (2017.01); *G06T 7/90* (2017.01); *G06T 17/20* (2013.01); *G06T 2207/20081* (2013.01)

(58) Field of Classification Search
CPC .......... G06T 7/001; G06T 17/20; G06T 7/90; G06T 7/136; G06T 7/13; G06T 2207/20081; B29C 64/386; B33Y 50/00

USPC .......................................................... 382/141
See application file for complete search history.

(56) References Cited

U.S. PATENT DOCUMENTS

| | | | |
|---|---|---|---|
| 8,591,225 B2 * | 11/2013 | Wu ...................... | G06T 7/0014 433/24 |
| 9,886,771 B1 | 2/2018 | Chen et al. | |
| 2014/0118339 A1 * | 5/2014 | Davies ...................... | G06T 7/74 345/419 |
| 2014/0210947 A1 * | 7/2014 | Finn ...................... | G06T 19/006 348/46 |
| 2014/0293016 A1 * | 10/2014 | Benhimane ............. | G06T 17/00 348/50 |
| 2017/0092003 A1 | 3/2017 | Hong et al. | |
| 2018/0047208 A1 * | 2/2018 | Marin .................. | H04N 13/243 |

(Continued)

OTHER PUBLICATIONS

Benjamin Hunting, Porsche Adopts Augmented Reality for Quality Assurance, Jul. 13, 2016, pp. 1-7, slashgear.com.

*Primary Examiner* — Ali Bayat
(74) *Attorney, Agent, or Firm* — Shun Yao; Yao Legal Services, Inc.

(57) ABSTRACT

One embodiment can provide a system for detecting a difference between a physical object and a reference model corresponding to the physical object. During operation, the system obtains a real-world image of the physical object and generates an augmented reality (AR) image by projecting a three-dimensional overlay generated from the reference model onto the physical object in the real-world image. While generating the AR image, the system aligns a pose of the reference model to a pose of the physical object. The system can detect the difference between the physical object and the reference model based on the generated AR image and the real-world image.

22 Claims, 8 Drawing Sheets

(56) References Cited

U.S. PATENT DOCUMENTS

2018/0350056 A1\* 12/2018 Cardenas Bernal .... G06T 7/001
2019/0096135 A1     3/2019 Dal Mutto et al.
2019/0108678 A1\*  4/2019 Hazeghi ............... H04N 13/239
2021/0145608 A1\*  5/2021 Herr ....................... A61B 5/004

\* cited by examiner

METHOD AND SYSTEM FOR CHANGE DETECTION USING AR OVERLAYS

BACKGROUND

Field

This disclosure is generally related to augmented reality (AR). More specifically, this disclosure is related to a system and method that implements AR overlays to detect changes between a design and a manufactured product.

Related Art

In recent years, the rapid development in 3D printing technology, including increased precision, repeatability, and material range, has made 3D printing or additive manufacturing a viable solution in industrial production. 3D printing has found many practical applications beyond rapid prototyping, including food manufacturing, fashion design, car manufacturing, agile tooling, medical applications, etc.

However, there are limitations in the technology, which can sometimes lead to defects in the manufactured products. Such defects can include over or under-deposition of material or structural collapse. Sometimes the defects can be subtle, and detecting the defect can be difficult or costly to users. For example, the thickness of a particular structure of the manufactured object can be slightly thicker or thinner than what is originally designed, or a supposedly flat surface can be slightly curved. Some systems may rely on advanced machine vision technologies and expensive imaging equipment (e.g., 3D laser scanners, computerized axial tomography (CT) machines, X-ray machines, etc.) to detect such imperfection and defects. Some systems rely on human inspectors to determine whether a manufactured object is the same as what is designed.

In addition to inspecting the quality of a 3D printed object, one may also need to detect the subtle changes of an object's construct and appearance, which can be caused by various environmental factors, such as weathering, wear-and-tear, poor maintenance, etc. Detecting such changes can be important in ensuring that a manufactured object can meet the design requirements or that equipments can be timely maintained. The ability to detect changes and/or magnitude of the changes can also facilitate repairing of the manufactured object when needed.

SUMMARY

One embodiment can provide a system for detecting a difference between a physical object and a reference model corresponding to the physical object. During operation, the system obtains a real-world image of the physical object and generates an augmented reality (AR) image by projecting a three-dimensional overlay generated from the reference model onto the physical object in the real-world image. While generating the AR image, the system aligns a pose of the reference model to a pose of the physical object. The system can detect the difference between the physical object and the reference model based on the generated AR image and the real-world image.

In a variation on this embodiment, aligning the pose of the reference model to the pose of the physical object can include identifying matching key points in the real-world image and the image generated from the reference model.

In a variation on this embodiment, the system can display, alternately, the real-world image and the AR image to the user, thereby facilitating the user to annotate the real-world image or the AR image to indicate a location and/or magnitude of the detected difference.

In a variation on this embodiment, the system can compute, automatically, one or more differences between the AR image and the real-world image; and generate, automatically, annotations that indicate locations and/or magnitudes of the computed differences.

In a further variation, the differences between the AR image and the real-world image can include a color difference, a textural difference, or a structural difference.

In a further variation, computing the color difference can include computing, at a pixel level, differences in color values between the AR and real-world images; and generating a difference mask by thresholding the differences in the color values.

In a further variation, computing the color difference can further include determining a difference in color calibration between the AR and real-world images In a further variation, computing the structural difference can include generating edge maps for the AR and real-world images and subtracting the edge maps from each other.

In a variation on this embodiment, the system can train a cognitive engine to recognize the physical object and the pose of the physical object in the real-world image.

In a further variation, the system can access a model database to obtain a reference model based on the recognized physical object. The model database comprises one or more of: a plurality of computer-aided design (CAD) models, a plurality of 3D meshes, and images of reference objects.

In a variation on this embodiment, the system can output a difference file that comprises a location, a magnitude, or a type of the detected difference between the physical object and the reference model.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein solve the technical problem of detecting changes between the design of a manufactured product and the product itself. In some embodiments, the intelligent change-detection system can harvest the ability of human perception to detect the difference between two images when they overlie one another. More specifically, using AR technology, the system can project and align a reference model (e.g., a 3D computer-aided design (CAD) model) of a product under inspection to the physical product. By rapidly switching the projected image on and off, a human user of the AR equipment (e.g., a user wearing AR-enabled goggles) is shown alternating un-augmented views and augmented views of the product. Consequently, the human user is able to identify the difference between the 3D reference model and the physical product, and he can then label such changes in the AR application. Alternatively, an automatic change-detection module can be used to detect the change or difference between the physical product and the reference model. The AR application can also generate outputs (e.g., a file or a set of parameters) that can quantify the detected difference, which can be used by other applications (e.g., an application for correcting defects in the manufactured product).

AR-Based Change-Detection System

As discussed previously, detecting imperfection or defects in manufactured objects can be difficult. The imperfection or defects can be the result of the less-than ideal manufacturing conditions (e.g., in terms of a 3D-printed object) or various environmental conditions (e.g., weathering, wear-and-tear, poor maintenance, etc.). Compared to advanced machine-vision technologies, which can be expensive and sometimes difficult to implement, human inspections can be low-cost and can provide flexibility. However, the human perceptual system is known to have difficulty visually observing subtle changes in the environment, known as "change blindness." This change blindness phenomenon makes it difficult for human inspectors to detect the difference between a manufactured object (which is a physical object) and a reference model (which is often in the form of a computer-generated image or images).

One way to help a human to detect slight changes between two images is to align the two images (e.g., with one on top of the other) and show the two images in rapid succession. Due to the violation of temporal persistence in various pixels in the images, the changes, although subtle, can become quite apparent to human eyes. In some embodiments, to facilitate a human inspector to detect changes between a manufactured product and its original design, a novel change-detection system can use AR technologies to align and project image(s) of a reference model onto the physical product while the human inspector is inspecting the physical product visually. By quickly turning on and off the projected images, this novel change-detection system allows a human inspector to view the model images and the physical product in rapid succession. Consequently, the human inspector can readily recognize the difference between the reference model and the physical product, thus identifying the defects.

Figure 1:
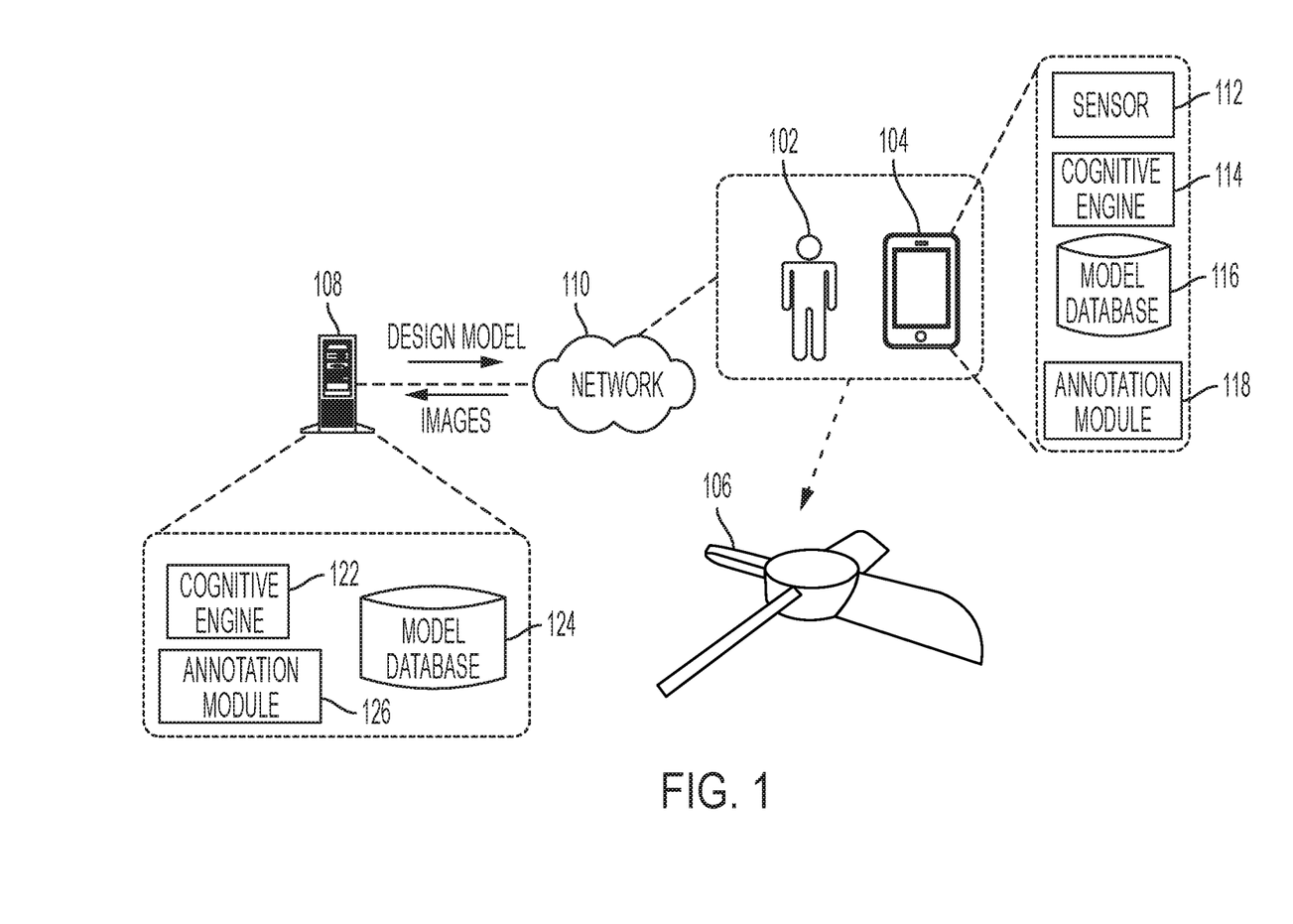
FIG. 1 presents an exemplary use scenario of the novel change-detection system, according to one embodiment.

FIG. 1 presents an exemplary use scenario of the novel change-detection system, according to one embodiment. In the example shown in FIG. 1, a human inspector or user 102 is equipped with a piece of augmented reality (AR) equipment 104, which can include a personal computer (PC), a handheld computer, a head-mounted computer (HMC), or smart eyeglasses, and is inspecting a manufactured product or real-world object 106. In the example shown in FIG. 1, AR equipment 104 can include a handheld computer (e.g., a tablet computer or a smartphone). In general, AR equipment 104 can include any computing device that has a camera and a display for displaying images captured by the camera. Manufactured product 106 can be a part of a machine (e.g., a printer, a car, or a plane engine) or a tool (e.g., pliers or wrenches).

AR equipment 104 is capable of capturing and displaying images of a real-world or physical object in a real-world environment or scene. AR equipment 104 can use various sensors (e.g., sensor 112), including both two-dimensional (2D) and three-dimensional (3D) sensors, to build a model of the real-world environment. In some embodiments, AR equipment 104 can use an RGB-D (red green blue plus depth) camera plus a simultaneous localization and mapping (SLAM) style algorithm to build a model of the real-world environment. Such information can then be used to align and overlay computer-generated objects (e.g., a design model) on a real-world object in the real-world scene.

In some embodiments, AR equipment 104 can optionally send images of real-world object 106 to a server 108 via a network 110. Server 108 can include a cognitive engine 122 that performs various image-recognition operations, such as feature extraction and tracking. Based on extracted and tracked features, cognitive engine 122 in server 108 can identify real-world object 106 and determine its pose (e.g., distance and orientation) with respect to the camera of AR equipment 104. For example, cognitive engine 122 in server 108 can identify real-world object 106 as a printer of a certain model and that the printer is facing forward with respect to a camera of tablet computer 104. Alternatively, a user can provide, as inputs to cognitive engine 122, identification information associated with real-world object 106. For example, the user can provide a name, a model number, a part number, or any identification information that can be used to identify real-world object 106. Moreover, once real-world object 106 is identified and its pose determined, server 108 can send a reference model corresponding to identified real-world object 106 and its determined pose to allow AR equipment (e.g., a tablet computer) 104 to project or overlay images of the design model on captured images of real-world object (e.g., a turbine) 106, with the pose of the reference model being aligned to the pose of real-world object 106. More specifically, server 108 can select, from a model database 124, a reference model corresponding to real-world object 106 and adjust the pose of the reference model such that the pose of the reference model matches the pose of real-world object 106. In other words, when viewed by user 102 using AR equipment 104, the reference model can have substantially the same shape and size as those of real-world object 106. This can result in images of the reference model substantially overlapping captured images of real-world object 106. Such images of the reference model can also be referred to as a 3D overlay, meaning that they are the overlaying image in the AR image. In alternative embodiments, AR equipment or tablet computer 104 itself may include a cognitive engine 114 for performing the image-recognition operations and a model database 116 for providing the reference model, and there is no need to send images of real-world object 106 to a remote server.

AR equipment 104 can be configured to display captured images of real-world object 106 and the pose-aligned images of the reference model (i.e., the 3D overlay) in an alternating manner. For example, each image can be displayed for a duration between a few hundred milliseconds and a few seconds. In some embodiments, user 102 can configure AR equipment 104 for the duration of each image. Moreover, user 102 can also configure the number of times each image is displayed. For example, user 102 can configure AR equipment 104 such that each image (including the captured image and the projected image) is displayed by the display of AR equipment 104 10 times and each time for 1 second.

AR equipment 104 can also include an annotation module 118 that allows user 102 to annotate a captured image in order to mark the location a change or defect is detected on real-world object 106. For example, user 102 can use certain drawing tools to mark the location of the detected change or defect. Alternatively, user 102 can annotate images of the reference model (e.g., a CAD model), and such annotation can be used to generate an updated design model. For example, a particular component in the CAD model can be annotated such that, when the CAD model is displayed to users, the particular component can be highlighted, indicating that a corresponding component of real-world object 106 is different than the CAD model. In some embodiments, server 108 can include an annotation module 126 capable of generating annotations on the reference model. Such annotations can be generated based on the difference detected between real-world object 106 and the reference model.

Figure 2A:
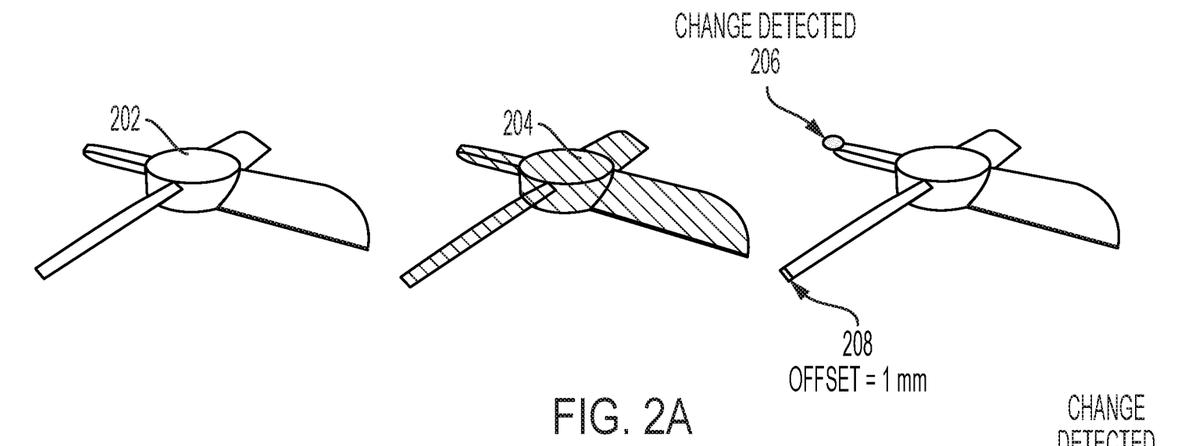
FIG. 2A illustrates a change-detection example, according to one embodiment.

FIG. 2A illustrates a change-detection example, according to one embodiment. The leftmost drawing of FIG. 2A is the un-augmented image of a physical environment showing a turbine 202. The center drawing shows an augmented-reality image of the same physical environment, with a computer-generated image of a turbine CAD model 204 being projected upon turbine 202. The pose of CAD model 204 matches the pose of turbine 202, such that the computer-generated image overlaps the image of turbine 202. The rightmost drawing of FIG. 2A shows an annotated image of turbine 202. More specifically, the rightmost drawing of FIG. 2A includes annotations 206 and 208, with each annotation indicating (e.g., using arrows) a location on turbine 202 of a change or difference between turbine 202 and turbine CAD model 204. More specifically, regions of the difference are circled or highlighted. In some embodiments, an annotation (e.g., annotation 208) can also indicate the magnitude of a change. For example, annotation 208 can indicate the offset between an edge of turbine 202 and turbine CAD model 204 is 1 mm.

Figure 2B:
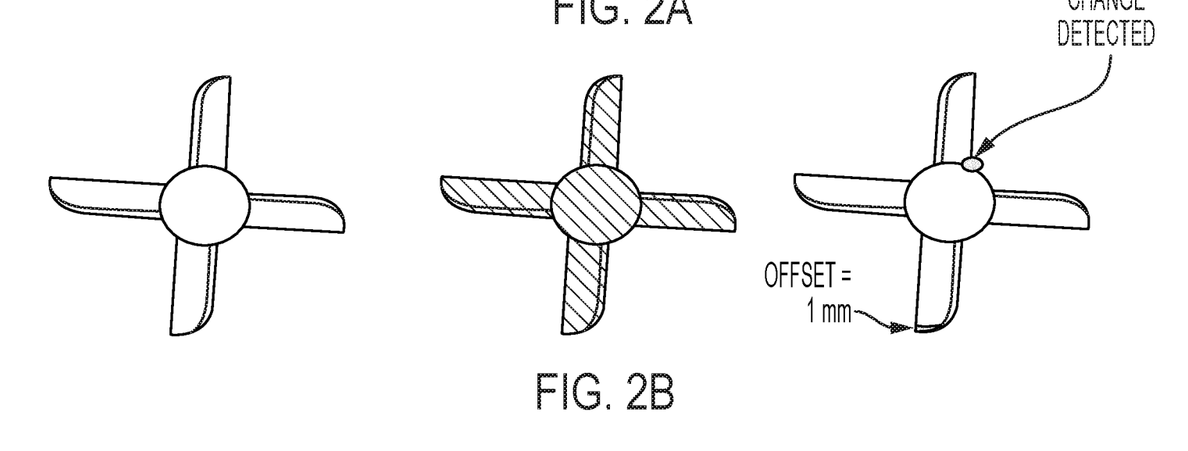
FIG. 2B illustrates the changes detected at a different viewing angle, according to one embodiment

Note that in the example shown in FIG. 2A, the physical object is viewed from a certain angle. In practice, to capture all differences between the physical object and its reference model, the physical object needs to be inspected from different viewing angles. To adjust the viewing angle, the user equipped with the AR equipment (e.g., a pair of smart glasses or a tablet computer) may adjust the viewing angle of the camera of the AR equipment, or the user may adjust the orientation of the physical object. Such adjustments can be done manually or using automatic control. For example, a user holding a tablet computer can walk around a large object (e.g., a printer) such that images of the object can be captured by the camera on the tablet computer from various angles. Alternatively, a smaller object (e.g., a printer part) can be placed on a rotational stage, such that images of the smaller object from different viewing angles can be captured without moving the camera. The rotational stage can be controlled manually or automatically. FIG. 2B shows the change detected at a different viewing angle, according to one embodiment. Note that, when the viewing angle changes, a previously undetectable change or difference may be detected.

Figure 3:
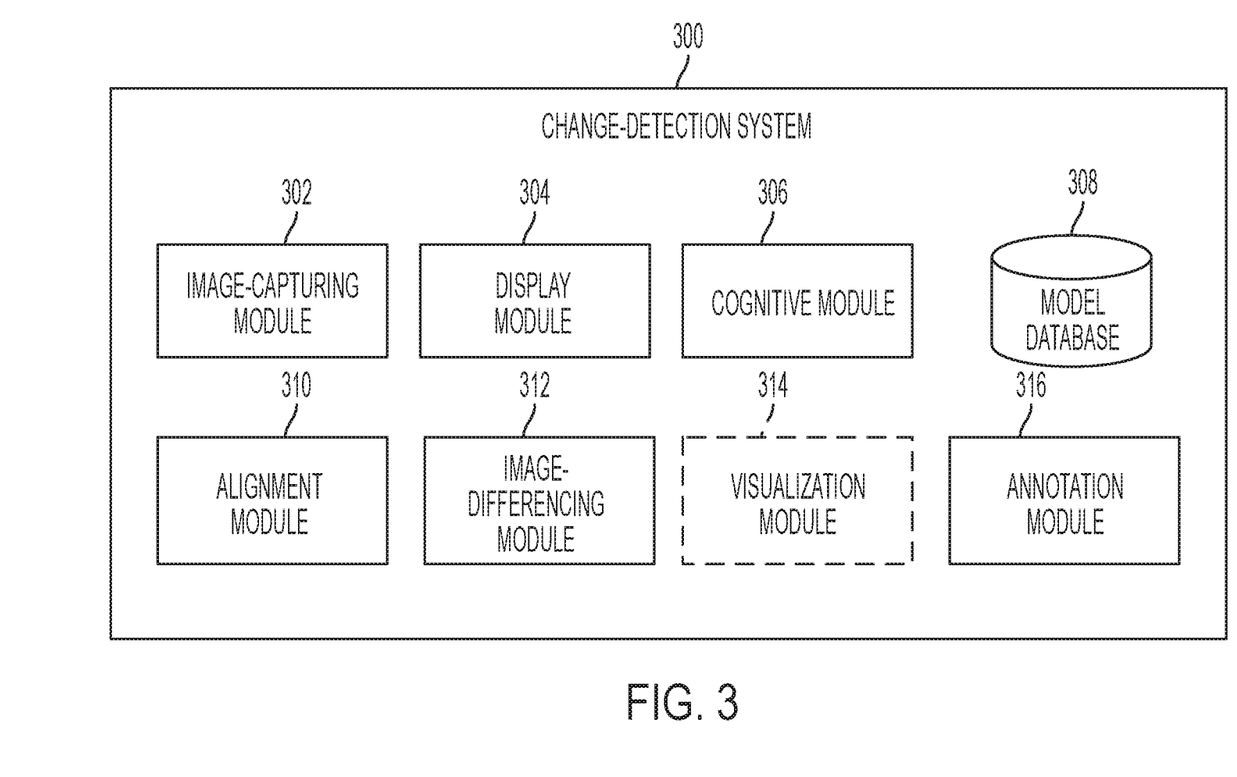
FIG. 3 presents a diagram illustrating an exemplary change-detection system, according to one embodiment.

FIG. 3 presents a diagram illustrating an exemplary change-detection system, according to one embodiment. Change-detection system 300 can include an image-capturing module 302, a display module 304, a cognitive module 306, a model database 308, an alignment module 310, an image-differencing module 312, a visualization module 314, and an annotation module 316.

Image-capturing module 302 can be responsible for capturing images of a physical world. More specifically, image-capturing module 302 can capture images of a physical object, such as a product manufactured using 3D printing or a piece of equipment under maintenance. In some embodiments, image-capturing module 302 can include a 2D or 3D camera capable of capturing still images and videos. Display module 304 can be responsible for displaying images captured by image-capturing module 302 as well as augmented versions of such images.

Cognitive module 306 can analyze images captured by image-capturing module 302. More specifically, cognitive module 306 can recognize an object in the captured images and its pose using various machine-learning techniques, such as supervised learning. In some embodiments, cognitive module 306 can be trained using a 3D design model (e.g., a 3D CAD model) or information obtained by performing 3D scanning of the object of interest. During training, the 3D design model or the 3D scan result can be manipulated such that different poses of the object can be recorded. Subsequently, the trained cognitive module 306 can identify the pose of the object in a captured image or video stream.

Model database 308 can include the design files (e.g., 3D CAD files) of a number of objects. For example, model database 308 can include the design files of printers of various models or design files of the various components of a printer. Based on the output of cognitive module 306, the system can access a design file corresponding to the identified object. In one example, if cognitive module 306 identifies that the object in the captured scene is a printer of a particular model, the CAD file of such a printer stored in model database 308 can be extracted.

Alignment module 310 can be responsible for aligning or matching the pose of the reference model to the pose of the physical object in the captured image. More specifically, alignment module 310 can output an image, from the reference model (e.g., a CAD model). The outputted image can include the CAD model of the physical object with the pose of the CAD model substantially matching the pose of the physical object in the captured image. In some embodiments, alignment module 310 can use a feature detector (e.g., a speeded up robust Features (SURF) detector) to find matching key points in the captured image and the computer-generated image. For example, a corner point in the captured image can be matched to a corner point in the computer-generated image. These pairs of matching key points can then be used to define an affine transformation matrix to map one image into the same coordinate space of the other image. More specifically, the CAD image of an object can be mapped into the same coordinate space of the captured image of the object. Note that alignment module 310 only needs to perform the alignment once. Once aligned, the position and/or orientation of the physical object in the captured image can change, without affecting the alignment between the physical object and its reference model. In other words, the pose of the reference model is locked to the pose of the physical object and can change according to the pose change of the physical object.

Figure 4:
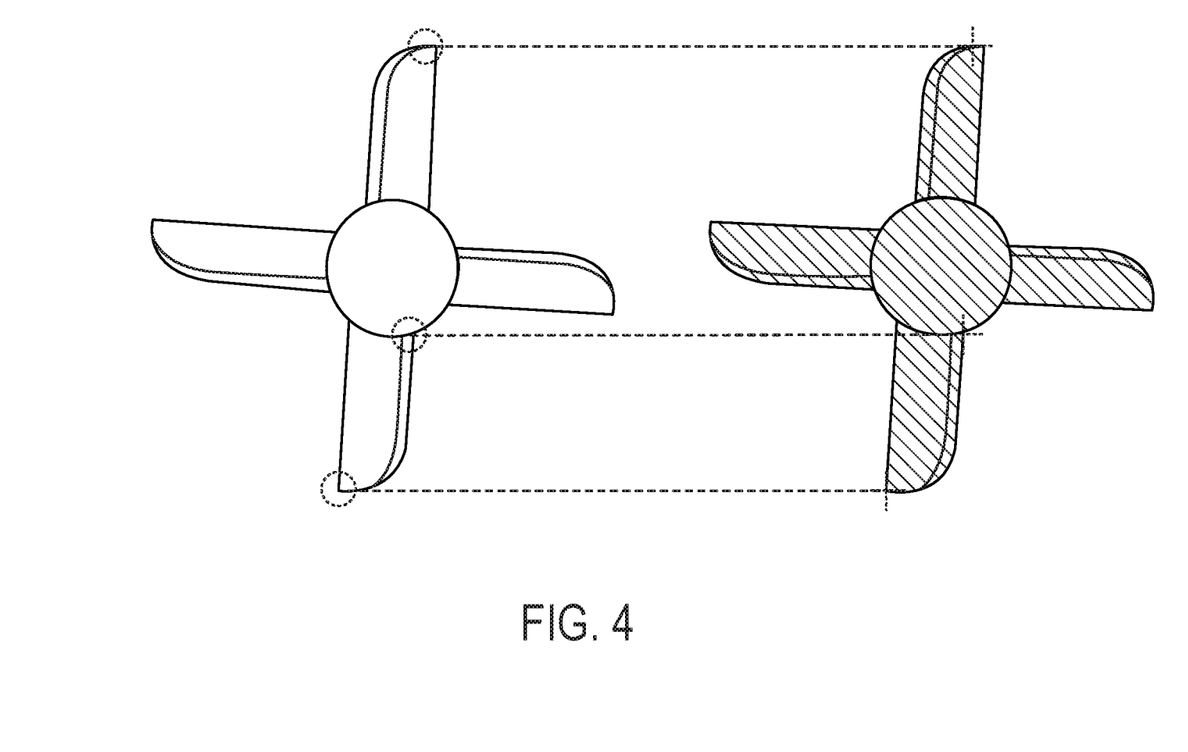
FIG. 4 illustrates an exemplary alignment between a computer-generated model and a physical object, according to one embodiment.

FIG. 4 illustrates an exemplary alignment between a computer-generated model and a physical object, according to one embodiment. The left drawing shows side-by-side the captured image of a turbine and a computer-generated image of the turbine CAD model. FIG. 4 also shows a number of lines, with a respective line connecting one point in the physical turbine model (marked by a circle) to a point in the turbine CAD model (marked by a cross). Such connected points are matching key points used by alignment module 310 to register the images. Alignment module 310 can then align the two images by overlaying and blending the two images such that one set of key points from one image is placed right on top of the corresponding set of matching key points.

In some embodiments, instead of finding the matching key points, alignment module 310 may directly manipulate the CAD model by outputting a CAD image that is perfectly aligned to the physical object in the captured image. More specifically, alignment module 310 can identify certain key points (e.g., edges or corners) in the captured image and infer the pose of the physical object based on relative positions of the identified key points. Because the reference model (e.g., the CAD model) typically registers the position information of all points, alignment module 310 can readily output a model image according to the inferred pose of the physical object and overlay the model image on the captured image.

Returning to FIG. 3, image-differencing module 312 can detect changes between the un-augmented image (e.g., the leftmost image of FIGS. 2A and 2B) and the augmented image with the computer-generated model overlying the physical object (e.g., the center image of FIGS. 2A and 2B). In some embodiments, image-differencing module 312 can compute (e.g., on a pixel level) the difference in grayscale or color intensity values and generate a difference mask by thresholding the difference values.

Due to variations in the imaging condition (e.g., the illumination condition), the color, texture, or shade of pixels in the captured images can be different from the corresponding pixels in the computer-generated model image. Moreover, the difference in color calibration between the camera and CAD model can also cause the difference in colors between the two images. However, such a color difference is an artificial effect and does not reflect any change. To prevent the system from treating such artificial effects as real changes, in some embodiments, when comparing colors, image-differencing module 312 takes into consideration the lighting or color-calibration difference. More specifically, image-differencing module 312 can generate a color histogram for each of the un-augmented and augmented images and use such generated color histograms to compare the frequency of pixels of various colors between the two images. Image-differencing module 312 can also match colors between the two images based on the counts. Using FIG. 2A as an example, the blue color in the CAD model (referred to as blue_reference), as shown in the center image, is different from the blue color in the captured image of the turbine (referred to as blue_physical). However, the count of pixels having the corresponding blue color in each image should be approximately the same. Hence, by matching the color histograms, image-differencing module 312 can match one color in one image to a corresponding color in the other image, although the two colors may have different values (e.g., RGB values or grayscale values). Image-differencing module 312 may also obtain the difference in value between the two colors, such a value difference being the expected difference. Moreover, when comparing colors between the two images (i.e., the un-augmented image and the augmented image), image-differencing module 312 can calculate the color difference at each pixel location, and if the color difference at a particular pixel location is greater than the expected difference by a certain threshold value, image-differencing module 312 can register the pixel location as where color change occurs.

Note that the difference in texture between the real-world image and the computer-generated model image can be a true difference or a artifact resulted from the lighting condition. To distinguish between a true difference and an artifact, the system can change the lighting condition (e.g., illumination angle or intensity) and check if the textural difference remains the same. If the textural difference is a true difference, the modification of the lighting condition may only change the magnitude but not the location of the detected textural difference.

In addition to being able to capture color differences, image-differencing module 312 is also capable of capturing the structural changes between the un-augmented and augmented images. In some embodiments, to capture the structural changes, image-differencing module 312 can first calculate edge maps for each image, and apply a series of morphological operators to each edge image. In one embodiment, a disk operator with a radius of 10 can be used to dilate the edge map generated from each image. Image-differencing module 312 can further compute a logical difference (e.g., by using an "and" operator or an "or" operator) between the edge maps and outputs a difference file, which can be a binary pixel map, where a logical value "1" indicates difference and a logical value "0" indicates no difference. Moreover, image-differencing module 312 can remove extraneous edge differences by applying another series of morphological operators. In one embodiment, an erosion morphological operator with a radius of 11 can be applied.

Figure 5A:
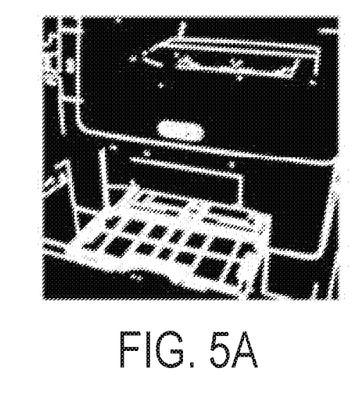
FIGS. 5A-5D illustrate how to compute image differences, according to one embodiment.
Figure 5B:
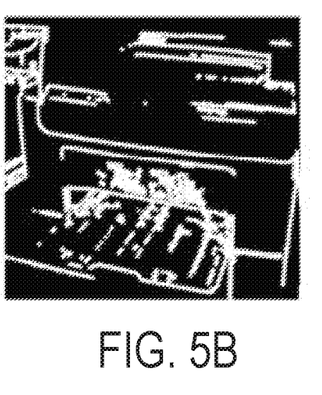
Figure 5C:
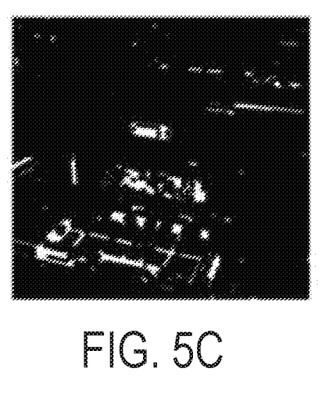
Figure 5D:
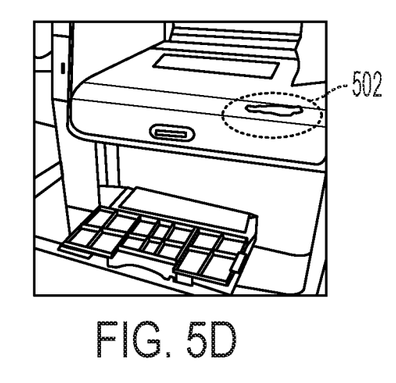

FIGS. 5A-5D illustrate how to compute image differences, according to one embodiment. In these examples, the physical object can be a printer, and the reference model can be the CAD model of printer. More specifically, FIG. 5A shows the computed edge map of a printer CAD model and FIG. 5B shows the computed edge map of the physical printer. FIG. 5C shows the difference between the two edge maps. FIG. 5D shows the detected difference by highlighting locations wherein the changes are detected on the CAD model.

Returning to FIG. 3, visualization module 314 can be responsible for facilitating the users to visualize the detected changes. In some embodiments, visualization module 314 can present the detected changes by highlighting the corresponding pixels in either the augmented image (as shown in FIG. 5D) or the un-augmented image. The visualization result can then be displayed to users by display module 304. The visualized changes can assist the user in validating and modifying the change-detection outcome. For example, the visualized changes can draw the user's attention to a certain area such that the user can have a closer look to determine whether such a difference is true or an artifact. To inspect such changes, the user may actively switch on and off the augmented view such that the user could see the difference between the augmented image and the un-augmented image. For example, in FIG. 5D, area 502 is highlighted, showing changes detected by image-differencing module 312. However, a close inspection by the user may indicate that such changes or differences are caused by light reflection on the physical printer and can be ignored. Moreover, the user can also adjust the viewing angle of the system, such that changes can be detected from different viewing angles. In some embodiments, visualization module 314 can be optional. Instead of displaying the changes to users using images, the changes can be automatically recorded in an output file, which registers the locations and/or magnitudes of detected changes. For example, the output file may indicate that the right corner of a 3D-printed object has 3 mm of over-deposited material.

In FIG. 3, annotation module 316 allows the user to annotate an image or images once the user has determined locations of real changes between the two images (i.e., the un-augmented and augmented images). The user can annotate either the un-augmented image (as shown by the rightmost images of FIGS. 2A and 2B) or the augmented image (similar to FIG. 5D). In the examples shown in FIGS. 2A and 2B, a user can hand draw, using an image-editing tool, boundaries of a change region, and annotation module 316 can highlight the bounded region. On the other hand, if the annotation is made in the augmented image, built-in edit functions in the CAD tool can allow the user to select and highlight a particular component or sub-component in the CAD model, thus indicating changes detected at the component or sub-component. In the scenario where the annotations are automatically generated by the system based on the output of image-differencing module 314, a user can make a decision on whether to accept or reject a system-generated annotation. For example, if a system-generated annotation is associated with an artifact (e.g., color difference due to various lighting conditions), the user may choose to reject this annotation, such that the annotation will not be part of the system output.

Figure 6A:
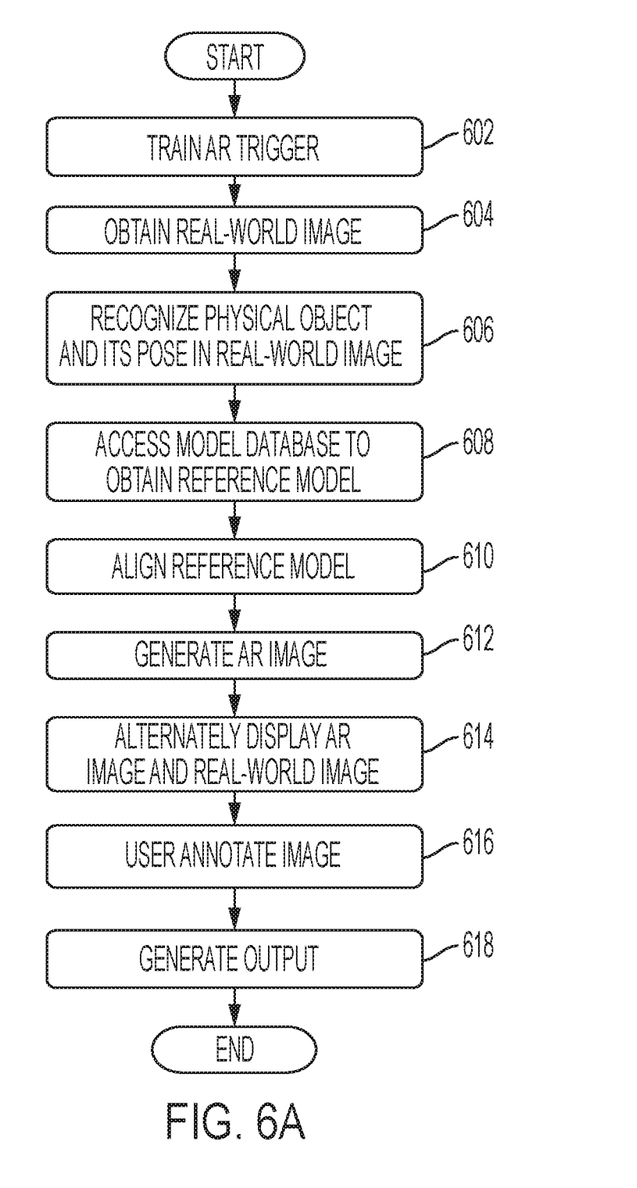
FIG. 6A presents a flowchart illustrating an exemplary AR-based change-detection process, according to one embodiment.

FIG. 6A presents a flowchart illustrating an exemplary AR-based change-detection process, according to one embodiment. Prior to detecting changes, the system trains an AR-alignment module (also referred to as an AR "trigger") using one or more 3D design files (operation 602). Such 3D design files can be obtained from the original design model (e.g., a 3D model) or can be extracted by performing a 3D scan on objects of interest. For example, the 3D scan of a physical object can produce a 3D mesh file. The trained AR trigger can be used by the system to recover the exact alignment of the design or mesh file from a stored or live video capture. More specifically, the trained AR trigger can identify an object being inspected (e.g., an object in the camera view) and extract its alignment information.

During operation, the system obtains an image of a physical object under inspection (operation 604). The image can be captured in real time locally, streamed remotely, or obtained from storage. In one scenario, the user can be in the same location with the physical object and operating a camera to capture images of the physical object. In an alternative scenario, the user may simply access a video file of the physical object.

Subsequently, the system uses the trained AR trigger to recognize the physical object and its pose in the image (operation 606), and accesses a model database to obtain a reference model (e.g., a CAD model) corresponding to the physical object (operation 608). The system can further align the reference model of the physical object according to the recognized pose of the physical object in the obtained image (operation 610) and generate an AR image by overlaying the pose-aligned reference model onto the physical object in the original image (operation 612). Because the pose of the reference model matches the pose of the physical object in the image, in the augmented image, the reference model substantially overlaps the physical object without interfering with the surrounding environment.

The system can then display the un-augmented and augmented image to the user (operation 614). For example, the system can rapidly turn on and off the AR overlay, thus allowing the user to view the un-augmented image and augmented image in rapid succession.

Based on the displayed un-augmented and augmented images, the user can manually annotate one or both images (operation 616). For example, the user can use a highlight tool to highlight regions on the physical object that is different from the reference model. The system can then generate an output based on the user annotation (operation 618).

Figure 6B:
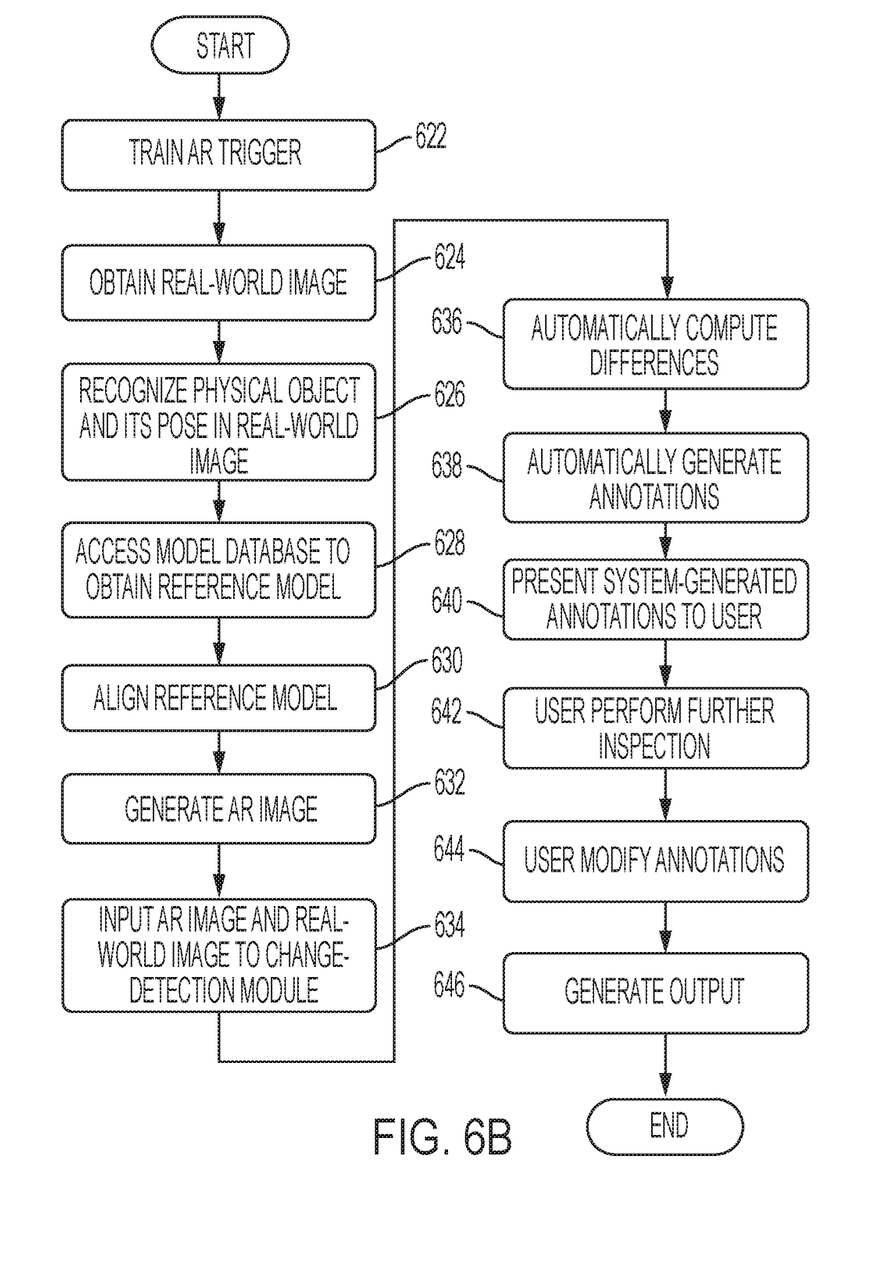
FIG. 6B presents a flowchart illustrating an exemplary AR-based change-detection process, according to one embodiment.

FIG. 6B presents a flowchart illustrating an exemplary AR-based change-detection process, according to one embodiment. Operations 622-632 can be similar to operations 602-612 shown in FIG. 6A.

Subsequent to generating the AR image, the system can input the original un-augmented image and the augmented image to a change-detection module (operation 634). The change-detection module can automatically compute differences between the augmented and un-augmented images (operation 636). The differences can include surface textural differences, color differences, and structural differences (e.g., height or width differences). The system can then automatically generate annotations that mark the locations of the color, textual, or structural differences (operation 638). In some embodiments, in addition to the location, the system-generated annotations may also indicate the magnitude of one or more differences. The system can present the system-generated annotation to the user (operation 640). Various visualization techniques can be used to mark the locations of the difference. In some embodiments, pixels where differences are detected can be highlighted. The difference-location marking can be done in either the augmented image or the un-augmented image and can be presented to the user.

By marking the locations of the detected differences and presenting such marks to the user, the system proposes to the user potential changes. Note that a difference between augmented and un-augmented images detected using image-analysis algorithms does not necessarily reflect the deviation of a product from its design. Sometimes, such differences can be an artifact caused by illumination conditions when the image is captured. Sometimes, such differences may not affect the quality of the product and can be ignored. In some embodiments, the user can perform further inspection at the marked locations (operation 642). For example, the user can operate the camera to zoom in to a marked location in order to further inspect the area to determine whether a true change exists at such a location. Alternatively, the user may change the viewing angle of the camera in order to have a better view of a marked location. Note that, each time the camera changes its pose, the system can automatically obtain the new alignment of the physical object with respect to the camera and can adjust the pose of the reference model in order to ensure that the reference model is properly projected onto the physical object. While performing the further inspection, the user can choose to reject, refine, or accept the proposed locations of changes.

Subsequent to performing the manual inspection, the user may modify the system-generated annotations (operation 644). The system can then generate an output (which can be a file or a set of parameters) based on the user's modification of the system-generated annotations (operation 646). An output file can map and quantify all system-detected changes as well as user manually marked changes. In some embodiments, the output file can include metrics such as confidence measures, types of change, change magnitude, etc. The output file can allow the user to quantify the defects of a manufactured product (e.g., a product of 3D printing), thus providing valuable information that can be used to improve the manufacture process. In some embodiments, the output file can be in the form of an annotated image, similar to what is shown in FIGS. 2A and 2B. In alternative embodiments, the output file can be in the form of a CAD file with embedded annotations, where an annotation to a component can include the aforementioned change metrics (e.g., a pixel location, a level of confidence, a type of change, a change magnitude, etc.). The output may further include a modified reference model, which can be used to guide subsequent manufacturing of the products. For example, by comparing a 3D printed object with its design model, one may detect possible manufacturing deviations from the design. Such deviations may be compensated by tweaking the model parameters.

In some embodiments, before an output is generated, the user may adjust the viewing angle of the camera to obtain new images of the physical object, and the entire change-detection process can repeat to allow the user to identify changes that maybe at locations that were out of the camera's view originally. As discussed previously, the modified camera view can also result in the 3D model being aligned differently in order to match the pose of the physical object in the modified camera view. Such a process can also be repeated multiple times until each and every portion of the physical object has been inspected by the user.

Exemplary Computer and Communication System

Figure 7:
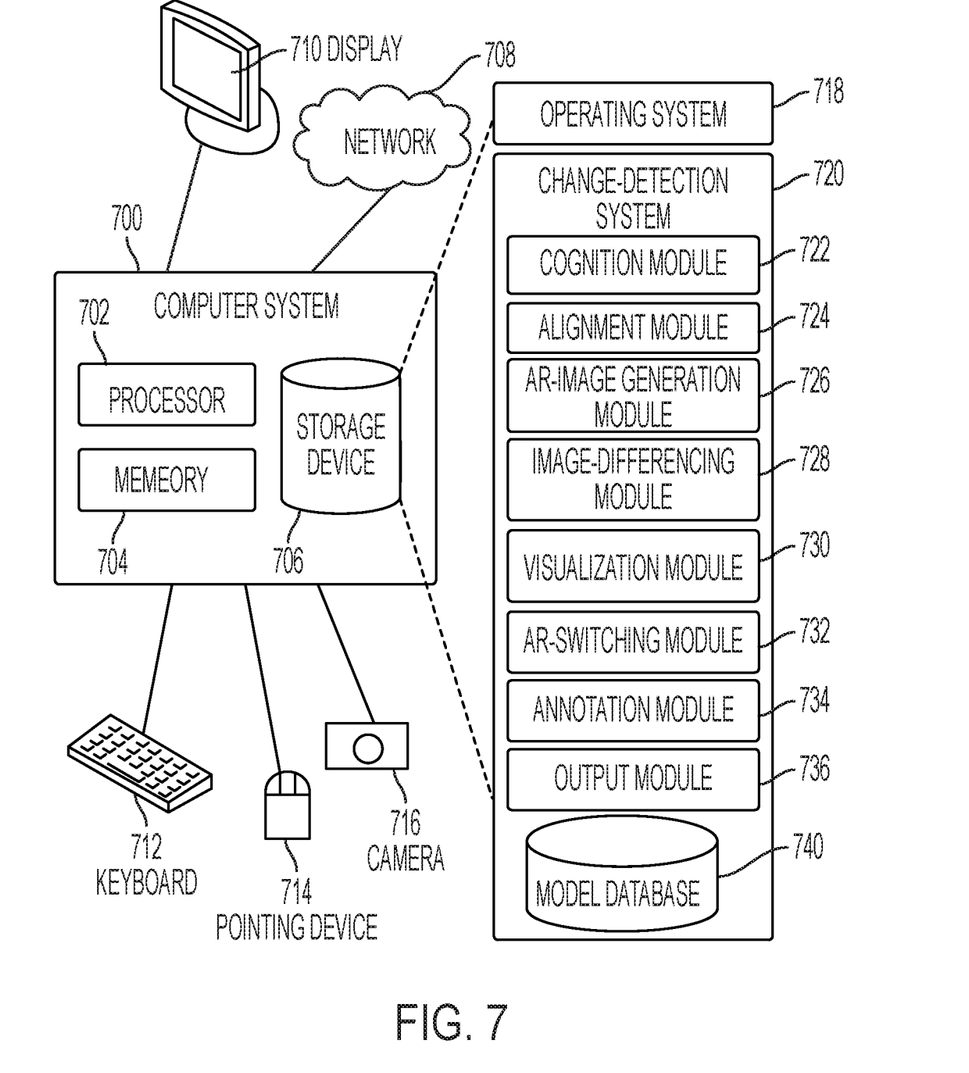
FIG. 7 illustrates an exemplary computer system that facilitates a change-detection system, according to one embodiment.

FIG. 7 illustrates an exemplary computer system that facilitates a change-detection system, according to one embodiment. Computer system 700 includes a processor 702, a memory 704, and a storage device 706. Computer system 700 can be coupled to a display device 710, a keyboard 712, a pointing device 714, a camera 716, and can also be coupled via one or more network interfaces to network 708. Storage device 706 can store an operating system 718 and a change-detection system 720.

Change-detection system 720 can include instructions, which when executed by computer system 700 can cause computer system 700 to perform methods and/or processes described in this disclosure. Change-detection system 720 can include instructions for recognizing a physical object and its pose in an image (cognition module 722), instructions for aligning a 3D model (which can be obtained from model database 740) based on the pose of the physical object (alignment module 724), instructions for overlaying the pose-aligned 3D model on the physical object to generate an AR image (AR-image-generation module 726), instructions for detecting differences between the AR image and the original image (image-differencing module 728), instructions for presenting a visual representation of the detected differences to a user (visualization module 730), instructions for alternately displaying the AR image and the original image to the user by switching on and off the AR overlay (AR-switching module 732), instructions for allowing the user to annotate images based on manual inspection (annotation module 734), and an output module for generating and outputting an output file that maps and quantifies all system-detected changes as well as user manually marked changes (output module 736).

In general, embodiments of the present invention provide a solution to detect changes or differences between a physical object and its standard, which can be a reference model or its original state before wear-and-tear. More specifically, an AR overlay can be generated and placed on real-world images of the physical object based on the reference model (which can include a design model or a 3D mesh file). The reference model can have substantially the same pose as the physical object such that in the AR image the reference model overlaps the physical object while leaving the environment unchanged. When presenting to the user, the AR overlay can be switched on and off rapidly, thus facilitating the user to recognize the difference between the reference model and the physical object. Moreover, the system can also include an automatic change-detection module that can detect differences between the AR image and the original image. The system-detected changes need to be confirmed by the user whether they are real changes or artifacts. The system can mark the locations of the differences in images and present the markings to the user, who can in turn pay closer attention to the marked locations in order to determine whether a difference in the two images reflects a real change between the physical object and its reference model. By involving a human inspector in the process of detecting changes, the system greatly enhances the accuracy and flexibility in the change-detection process. For example, a human inspector can change the viewing angle and zoom distance of the camera when needed. Moreover, due to varying illumination conditions, differences in images may not reflect real change, thus requiring confirmation from a human inspector. On the other hand, compared to the approaches relying only on human inspection, the current system can improve the speed and accuracy of detecting changes. Some changes can be subtle for the human inspector to notice. However, by switching on and off the AR overlay in rapid succession, the system enhances the perception of the human inspector. Moreover, the change-detection module that can automatically compute differences between the AR image containing the 3D model and the original image containing the physical object can effectively direct the attention of the human inspector to potential locations where change may occur, thus significantly increasing the inspection efficiency.

In some embodiments, the AR overlay can be applied to images captured in real time, whether locally or remotely. Alternatively, the AR overlay can also be applied to archived images. In other words, a user may remotely inspect a product by streaming live videos of the product or a user may inspect the product by accessing video files that were previously captured and stored. This allows both online and offline inspection of manufactured products.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed.

When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for detecting a difference between a physical object and a reference model corresponding to the physical object, the method comprising:
   obtaining a real-world image of the physical object;
   generating an augmented reality (AR) image by projecting a three-dimensional (3D) overlay generated from the reference model onto the physical object in the real-world image, wherein generating the AR image comprises aligning a pose of the reference model to a pose of the physical object;
   detecting the difference between the physical object and the reference model based on the generated AR image and the real-world image; and
   displaying the real-world image and the AR image to the user, thereby facilitating the user to annotate the real-world image or the AR image to indicate a location or magnitude of the detected difference.

2. The method of claim 1, wherein aligning the pose of the reference model to the pose of the physical object comprises identifying matching key points in the real-world image and the image generated from the reference model.

3. The method of claim 1, wherein the real-world image and the AR image are alternately displayed to the user.

4. The method of claim 1, further comprising:
   computing, automatically, one or more differences between the AR image and the real-world image; and
   generating, automatically, annotations that indicate locations or magnitudes of the computed differences.

5. The method of claim 4, wherein the one or more differences between the AR image and the real-world image comprise a color difference, a textual difference, or a structural difference.

6. The method of claim 5, wherein computing the color difference comprises:
   computing, at a pixel level, differences in color values between the AR and real-world images; and
   generating a difference mask by thresholding the differences in the color values.

7. The method of claim 6, wherein computing the color difference further comprises determining a difference in color calibration between the AR and real-world images.

8. The method of claim 5, wherein computing the structural difference comprises:
   generating edge maps for the AR and real-world images; and
   subtracting the edge maps from each other.

9. The method of claim 1, further comprising:
   training a cognitive engine to recognize the physical object and the pose of the physical object in the real-world image.

10. The method of claim 9, further comprising:
    accessing a model database to obtain a reference model based on the recognized physical object, wherein the model database comprises one or more of: a plurality of computer-aided design (CAD) models, a plurality of 3D meshes, and images of reference objects.

11. The method of claim 1, further comprising outputting a difference file that comprises a location, a magnitude, or a type of the detected difference between the physical object and the reference model.

12. A computer system for detecting a difference between a physical object and a reference model corresponding to the physical object, the system comprising:
    a processor; and
    a storage device coupled to the processor and storing instructions which when executed by the processor cause the processor to perform a method, wherein the method comprises:
    obtaining a real-world image of the physical object;
    generating an augmented reality (AR) image by projecting a 3D overlay generated from the reference model onto the physical object in the real-world image, wherein generating the AR image comprises aligning a pose of the reference model to a pose of the physical object;
    detecting the difference between the physical object and the reference model based on the generated AR image and the real-world image; and
    displaying the real-world image and the AR image to the user, thereby facilitating the user to annotate the real-world image or the AR image to indicate a location or magnitude of the detected difference.

13. The computer system of claim 12, wherein aligning the pose of the reference model to the pose of the physical object comprises identifying matching key points in the real-world image and the image generated from the reference model.

14. The computer system of claim 12, wherein the real-world image and the AR image are alternately displayed to the user.

15. The computer system of claim 12, wherein the method further comprises:
    computing, automatically, differences between the AR image and the real-world image; and
    generating, automatically, annotations that indicate locations and/or magnitudes of the computed differences.

16. The computer system of claim 15, wherein the differences between the AR image and the real-world image comprise a color difference, a textual difference, or a structural difference.

17. The computer system of claim 16, wherein computing the color difference comprises:
    computing, at a pixel level, differences in color values between the AR and real-world images; and
    generating a difference mask by thresholding the differences in the color values.

18. The computer system of claim 17, wherein computing the color difference further comprises determining a difference in color calibration between the AR and real-world images.

19. The computer system of claim 16, wherein computing the structural difference comprises:
    generating edge maps for the AR and real-world images; and
    subtracting the edge maps from each other.

20. The computer system of claim 12, wherein the method further comprises:
    training a cognitive engine to recognize the physical object and the pose of the physical object in the real-world image.

21. The computer system of claim 20, wherein the method further comprises:
    accessing a model database to obtain a reference model based on the recognized physical object, wherein the model database comprises one or more of: a plurality of computer-aided design (CAD) models, a plurality of 3D meshes, and images of reference objects.

22. The computer system of claim 12, wherein the method further comprises outputting a difference file that comprises a location, a magnitude, or a type of the detected difference between the physical object and the reference model.

* * * * *